United States Patent [19]

Coleman et al.

[11] Patent Number: 5,001,303
[45] Date of Patent: Mar. 19, 1991

[54] METALLIC SHEATH ELECTRICAL CABLE

[75] Inventors: Allan Coleman, Highland Park; Wayne J. Kowalski, Buffalo Grove, both of Ill.

[73] Assignee: Coleman Cable Systems, Inc., North Chicago, Ill.

[21] Appl. No.: 358,575

[22] Filed: May 26, 1989

[51] Int. Cl.$^5$ ............................................. H01B 7/20
[52] U.S. Cl. ......................... 174/102 R; 174/102 SP; 174/102 D
[58] Field of Search .......... 174/102 R, 102 SP, 102 D

[56] References Cited

U.S. PATENT DOCUMENTS

| | | | |
|---|---|---|---|
| Re. 32,225 | 8/1986 | Neuroth | 174/103 |
| 296,294 | 4/1884 | Miner | 174/102 R |
| 1,668,953 | 5/1928 | Erickson | 174/101 |
| 1,813,039 | 7/1931 | Escol | 174/102 D |
| 2,200,776 | 5/1940 | Hoover | 156/55 |
| 2,283,117 | 5/1942 | Arutunoff | 417/410 |
| 2,338,299 | 1/1944 | Rasmussen | 174/102 SP |
| 3,404,217 | 10/1968 | Kelly | 174/103 |
| 3,422,214 | 1/1969 | Kelly | 174/103 |
| 3,745,230 | 7/1973 | Kelly | 174/103 |
| 4,245,873 | 1/1981 | Markowitz | 439/32 |
| 4,409,431 | 10/1983 | Neuroth | 174/103 |
| 4,453,035 | 6/1984 | Neuroth | 174/103 |
| 4,490,577 | 12/1984 | Neuroth | 174/102 SP X |
| 4,494,808 | 1/1985 | Widell et al. | 439/119 |
| 4,600,805 | 7/1986 | Glynn et al. | 174/102 R |
| 4,716,260 | 12/1987 | Hoffman et al. | 174/102 R |

FOREIGN PATENT DOCUMENTS

| | | | |
|---|---|---|---|
| 476498 | 12/1952 | Italy | 174/102 R |
| 71406 | 12/1946 | Norway | 174/102 D |
| 591432 | 8/1947 | United Kingdom | |

OTHER PUBLICATIONS

Publication of Trakker Corporation Entitled "Planning Your Circuit", Utility & Design Patents Pending, 1985.

Primary Examiner—Morris H. Nimmo
Attorney, Agent, or Firm—Welsh & Katz, Ltd.

[57] ABSTRACT

An electrical cable having a tubular metallic sheath carrying insulated electrical conductors and which, in various embodiments, has a substantially rectangular transverse cross-sectional configuration defined by pairs of parallel sidewalls which enable selective bending of the cable generally about the major and minor axes of the sheath. The parallel sidewalls may have substantially transverse or angular inclined corrugations formed along their lengths to facilitate bending of the cable in relatively small radius bends about the major and minor axes of the sheath.

27 Claims, 1 Drawing Sheet

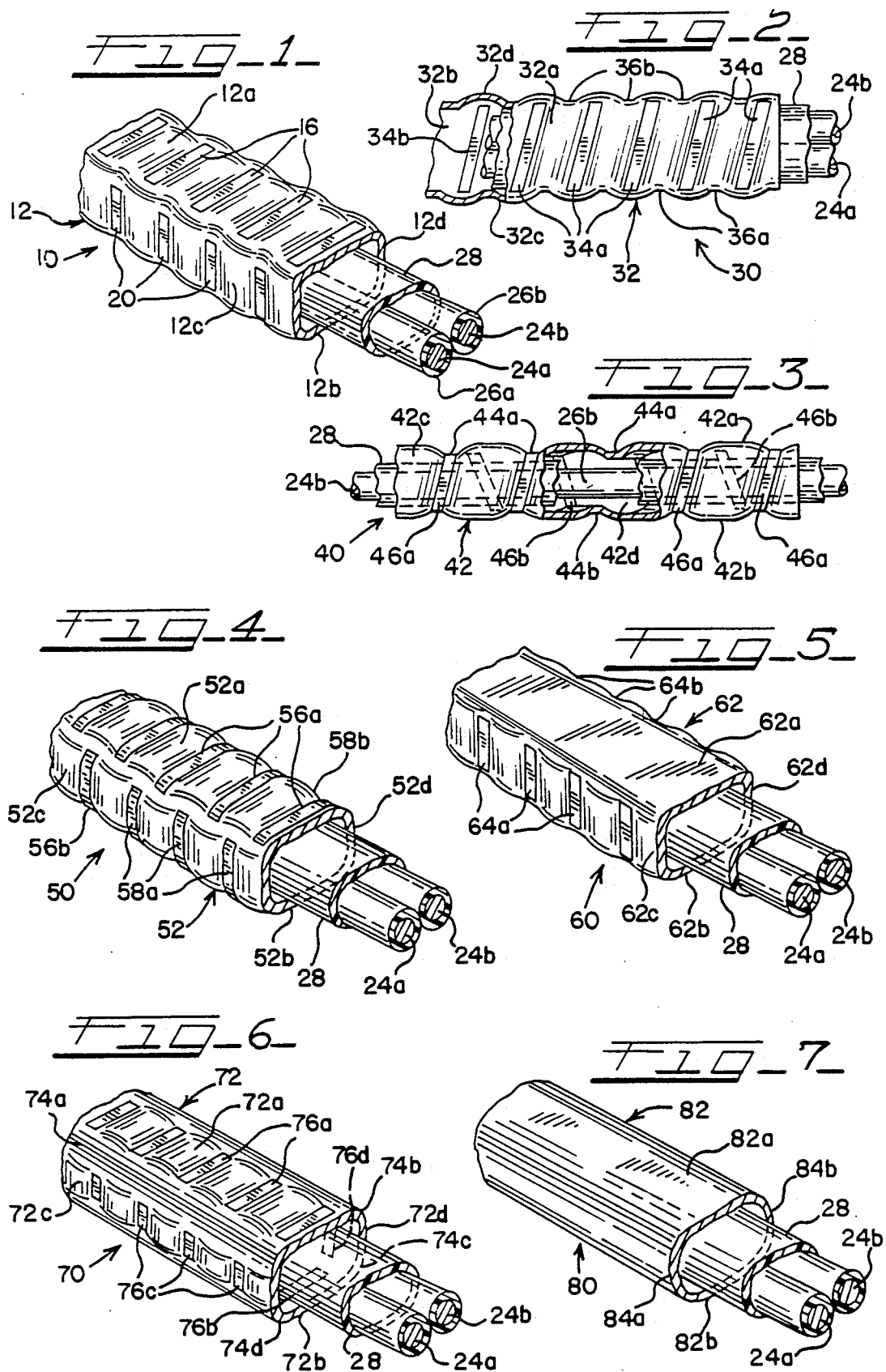

METALLIC SHEATH ELECTRICAL CABLE

BACKGROUND OF THE INVENTION

The present invention relates generally to electrical cable, and more particularly to a novel electrical cable having a tubular metallic sheath of substantially rectangular transverse cross-section and configured to enable selective bending generally about the major and minor axes of the sheath cross-section.

It is conventional to employ metal sheathed electrical cable in many types of electrical circuit systems. Traditionally, metal sheathed cable has been classified in two basic categories; Type ALS (smooth and corrugated aluminum and copper sheathed) and Type MC cable available with interlocked steel or aluminum tape. More recently, the National Fire Protection Agency (NFPA) merged four basic cable types under the National Electric Code as follows:

1. Smooth continuous aluminum sheath.
2. Continuous corrugated aluminum sheath.
3. Interlocked steel armor.
4. Interlocked aluminum armor.

These four types of metal sheathed cable have also been subjected to recognized industrial standards by industry certification groups such as Underwriters' Laboratories, Inc., Northbrook, Ill.

The selection of one or more of the aforelisted types of metal sheathed cable for a particular application is at least in part determined by their various characteristics. For example, applications requiring plenum and wet location installations generally require the use of continuous impervious metal sheath, while portable equipment and fixtures generally call for the use of interlocked type steel sheath to facilitate repeated flexing. Common to all metallic sheath cable types is the need for a lightweight, readily strippable and easily pulled cable, with reliable grounding means and reasonable cost. The present invention addresses this need by providing a flat electrical cable construction which exhibits the advantages of prior metal sheath cable and provides significant improvements in ease of installation, grounding safety, size, weight and economic savings.

SUMMARY OF THE INVENTION

One of the primary objects of the present invention is to provide a novel electrical cable having one or more parallel insulated electrical conductors carried within a tubular metallic sheath of substantially rectangular transverse cross-section and configured to enable selective bending generally about the major and minor axes of the sheath cross-section.

A more particular object of the present invention is to provide a novel electrical cable having a tubular metallic sheath which, in various embodiments, has a substantially rectangular transverse cross-sectional configuration defined by pairs of generally parallel sidewalls having widths, respectively, substantially equal to the major and minor axis dimensions of the sheath cross-section and which enable selective bending generally about the major and minor axes of the sheath.

Another object of the present invention is to provide a novel generally flat electrical cable as described wherein selected ones of the parallel sidewalls have corrugations formed therealong to facilitate bending generally about the major and minor axes of the sheath cross-section.

A feature of one embodiment of the electrical cable in accordance with the invention lies in forming the corrugations in angularly inclined relation to a plane transverse to the longitudinal axis of the sheath, the corrugations on adjacent sidewalls either being offset or continuous in generally helical fashion.

Another feature of the electrical cable in accordance with the invention lies in its ability to be selectively bent generally about the major and minor axes of the sheath rectangular cross-section in substantially smaller bending radii than heretofore obtainable under industry standards on bend radius.

Further objects, advantages and features of the invention will become apparent from the following detailed description of various embodiments of the invention when taken in conjunction with the accompanying drawings wherein like reference numerals designate like elements throughout the several views.

BRIEF DESCRIPTION OF THE DRAWINGS

FIG. 1 is a fragmentary perspective view of a metal sheath electrical cable constructed in accordance with one embodiment of the present invention;

FIG. 2 is a fragmentary plan view of an electrical cable similar to FIG. 1 but having the sidewall corrugations angularly inclined relative to a plane transverse to the longitudinal axis of the cable;

FIG. 3 is a fragmentary side elevational view of an electrical cable similar to FIG. 2 but having the sidewall corrugations formed so as to establish a continuous generally helical corrugation pattern along the length of the cable sheath; and FIGS. 4–7 are fragmentary perspective views similar to FIG. 1 but illustrating various alternative embodiments of a metallic sheath electrical cable constructed in accordance with the invention.

DETAILED DESCRIPTION

Referring now to the drawings, and in particular to FIG. 1, an electrical cable constructed in accordance with one embodiment of the invention is indicated generally at 10. The electrical cable 10, which may be termed a metal or metallic sheath cable, includes an elongated tubular metallic sheath 12 of generally rectangular transverse cross-sectional configuration having major and minor axes. The sheath 12 is preferably made of aluminum or an aluminum alloy and has a first pair of parallel generally flat sidewalls 12a and 12b of a width generally equal to the major axis dimension of the sheath rectangular cross-section. In the embodiment illustrated in FIG. 1, the sidewalls 12a and 12b have their respective longitudinal marginal edges formed integral with corresponding longitudinal marginal edges of a second pair of parallel generally flat sidewalls 12c and 12d which are normal to the walls 12a and 12b and are of a width generally equal to the minor axis dimension of the sheath.

The sheath 12 may have a nominal wall thickness of approximately 0.022 inch and may be formed as a seamless continuous sheath or alternatively formed from a flat strip of metal sheet which is formed into a generally rectangular tubular sheath and has its abutting longitudinal edges welded to form a closed liquid impervious sheath. The sheath 12 could also be formed from a flat metallic armor strip which is helically wrapped about a mandrel or the like to form a generally rectangular sheath, the abutting or juxtaposed edges of the helically wound strip being preferably interlocked as by forming the marginal edges of the strip into generally sine wave configuration and overlapping the adjacent edges in nested interfitting relation.

In accordance with one feature of the electrical cable 10, the sheath 12 is configured to enable selective bending through relatively small radius bends generally about the major and minor axes of the sheath transverse cross-sectional configuration. In the embodiment illustrated in FIG. 1, the first and second pairs of sidewalls 12a,12b and 12c,12d have generally transverse corrugations formed along their longitudinal lengths. For example, the parallel sidewalls 12a and 12b have identical generally transverse corrugations 16 formed therein which are in parallel equal spaced relation, with each corrugation lying in a plane substantially transverse to the longitudinal axis of the sheath 12. Similarly, the sidewalls 12c and 12d each have parallel and equally spaced transverse corrugations 20 formed along their longitudinal lengths so that each corrugation lies in a plane substantially transverse to the longitudinal axis of the sheath. The corrugations 16 and 20 may be formed as generally narrow flat deformations in the sidewalls or as smooth arcuate concave channels. Corrugations 16 are offset longitudinally from the corrugations 20 so that the corrugations formed in the sidewalls 12a,b do not intersect the corrugations in the sidewalls 12c,d.

The rectangular metallic sheath 12 is sized to receive at least one, and preferably at least two, insulated electrical conductors, indicated at 24a and 24b. The conductors 24a,b may comprise, for example, No. 12 AWG solid electrical conductors having conventional coaxial insulation layers or jackets 26a and 26b, respectively The insulated conductors 24a,b extend longitudinally along the metallic sheath such that the longitudinal axes of the conductors are coplanar and parallel to the longitudinal axis of the sheath The insulated conductors are preferably maintained in juxtaposed relation by conventional bedding tape 28 which may be helically wound or folded along the longitudinal length of the paired conductors. Alternatively, the insulated conductors 24a,b may be maintained in parallel relation by an extruded jacket covering or the like. The sheath 12 is configured to provide a suitable stripping clearance between the internal wall surfaces of the metallic sheath and the external surface of the bedding tape 28. In a two conductor No. 12 AWG electrical cable, it has been found that a minor axis outer dimension of approximately 0.192 inch and a major axis outer dimension of approximately 0.302 inch enables the rectangular sheath 12 to be bent in relatively small radius bends about either the major or minor transverse axes.

FIG. 2 illustrates an alternative embodiment of an electrical cable, indicated generally at 30, which may also be termed a metallic sheath cable and which includes a metallic sheath 32 of generally rectangular transverse cross-sectional configuration similar to the cross-sectional configuration of the metallic sheath 12. The sheath 32 thus has a major transverse axis of greater dimension than the minor transverse axis dimension. The electrical cable 30 also carries a pair of insulated conductors 24a and 24b which are wrapped with a suitable bedding tape 28 and have coplanar longitudinal axes parallel to the longitudinal axis of the sheath.

In the embodiment of FIG. 2, the sheath 32 has a first pair of substantially parallel sidewalls 32a and 32b of a transverse width substantially equal to the major transverse dimension of the sheath. The longitudinal marginal edges of sidewalls 32a,b are formed integral with corresponding edges of a second pair of parallel sidewalls 32c and 32d which lie in planes normal to the sidewalls 32a, 32b and are of a transverse width substantially equal to the minor axis dimension of the rectangular sheath. The cable 30 differs from cable 10 in that the sidewalls 32a and 32b have parallel spaced corrugations 34a and 34b, respectively, which are similar to the corrugations 16 but are angularly inclined relative to a plane transverse to the longitudinal axis of the cable. In the embodiment of FIG. 2, the centerline of each concave corrugation 34a,b forms an included angle of approximately 15° with a plane transverse to the longitudinal axis of the sheath 32, as considered in the plan view of FIG. 2. The sidewalls 32c and 32d also have parallel spaced corrugations formed therein, as indicated at 36a and 36b, which are similarly angularly inclined at approximately 15° to a plane transverse to the longitudinal axis of the metal sheath as considered in the planes of sidewalls 32c,d. The angled or inclined corrugations 34a,b in the sidewalls 32a,b are offset from the corrugations 36a,b in the sidewalls 32c,d so that the corrugations do not intersect each other. In other respects, the cable 30 may have the same dimensional size and stripping clearances as cable 10 so as to enable relatively small radius bending about the major and minor transverse axes of the sheath.

FIG. 3 illustrates a side elevation of another embodiment of an electrical cable, indicated generally at 40, which also may be termed a metallic sheath cable and which includes a metallic sheath 42 of generally rectangular transverse cross-sectional configuration similar to the cross-sectional configurations of the aforedescribed metallic sheaths 12 and 32. The rectangular sheath 42 has a first pair of parallel generally flat sidewalls 42a and 42b of a transverse width substantially equal to the major transverse dimension of the sheath, and has a second pair of parallel generally flat sidewalls 42c and 42d formed integral with and normal to the sidewalls 42a,b. The sheath 42 carries a pair of insulated conductors, one of which is indicated at 24b, maintained in parallel coplanar relation by a bedding tape wrap 28 such that the longitudinal axes of the conductors are parallel to the longitudinal axis of the metallic sheath.

The sidewalls 42a,b and 42c,d of the metallic sheath 42 each have parallel spaced corrugations, indicated at 44a,b and 46a,b, respectively, formed along their longitudinal lengths. The corrugations 44a,b and 46a,b are inclined or angled relative to a plane transverse to the longitudinal axis of the sheath at angles of inclination of approximately 15°, as considered in the planes of the respective sidewalls, similar to the corrugations 34a,b and 36a,b in sheath 32. The metallic sheath 42 differs from sheath 32 in that the corrugations 44a,b and 46a,b intersect each other so as to form a generally helical corrugation along the length of the sheath 42. In other respects, the cable 40 has similar dimensional size and stripping clearances as the aforedescribed electrical cables 10 and 30 and enables relatively small radius bending about the major and minor transverse axes of the sheath 42.

In the embodiments of FIGS. 1, 2 and 3, the corrugations in the corresponding rectangular sheath sidewalls may be formed so as to establish approximately 4.5–5 corrugations per linear inch along the longitudinal lengths of the sheaths A bare or insulated ground wire may also be carried with the conductors 24a,b within the bedding tape wrap if desired Each corrugated sheath may have a profile thickness of approximately 0.065–0.080 inch with a corrugation depth of between approximately 0.040 and 0.055 inch.

FIG. 4 illustrates another embodiment of an electrical cable, indicated generally at 50, which may also be termed a metallic sheath cable and which includes a metallic sheath 52 of generally rectangular transverse cross-sectional configuration and carrying a pair of insulated electrical conductors 24a and 24b which are wrapped within a bedding tape 28 such that the longitudinal axes of the electrical conductors are coplanar and parallel to the longitudinal axis of the sheath 52.

The metallic sheath 52 has first and second pairs of generally flat parallel sidewalls 52a,b and 52c,d which are interconnected along their marginal longitudinal edges through rounded or arced corner edge surfaces indicated at 54a–d. The sidewalls 52a,b and 52c,d have parallel generally equidistantly spaced transverse corrugations formed along their longitudinal lengths, such as indicated at 56a,b and 58a,b, in similar fashion to the corrugations in the sidewalls of the metallic sheath 12. The respective corrugations 56a,b and 58a,b terminate at the rounded corner edges 54a–d and are offset relative to each other so that the corrugations in the sidewalls 52a,b do not intersect the corrugations in the sidewalls 52c,d. In other respects the electrical cable 50 may have similar dimensional size and stripping clearances as the cable 10 and is bendable in relatively small radius bends about the major and minor transverse axes of the sheath.

FIG. 5 illustrates still another embodiment of an electrical cable, indicated generally at 60, which also may be termed a metallic sheath cable and which includes a metallic sheath 62 of substantially rectangular transverse cross-sectional configuration similar in dimensional size to the sheath 12 of the electrical cable 10. The metallic sheath 62 has first and second pairs of generally flat substantially parallel sidewalls 62a,b and 62c,d, respectively, which have their longitudinal marginal edges integrally connected so as to form the generally flat rectangular sheath. The sheath 62 also carries a pair of insulated electrical conductors 24a and 24b wrapped with a bedding tape 28 such that the longitudinal axes of the conductors are coplanar and parallel to the longitudinal axis of the sheath. The sheath 62 differs from the aforedescribed sheath 12 in that the sidewalls 62a and 62b, which define the major axis sidewalls of the sheath, do not have corrugations formed therein but are generally smooth flat surfaces The sidewalls 62c,d have parallel spaced transverse corrugations 64a and 64b, respectively, formed along their longitudinal lengths. The major and minor transverse axes of the sheath 62 are established to enable selective bending of the cable 60 through relatively small radius bends generally about the major and minor transverse axes of the sheath.

FIGS. 6 and 7 illustrate further embodiments of an electrical cable in accordance with the invention, indicated at 70 and 80, respectively, each of which may alternatively be termed a metallic sheath cable of flat construction configured to enable selective bending through relatively small radius bends generally about major and minor transverse axes of the respective cables. More particularly, the electrical cable 70 includes a tubular metallic sheath 72 having generally flat but transversely corrugated parallel sidewalls 72a and 72b which lie parallel to the major transverse axis of the sheath. The sheath 72 also has a second pair of generally flat but transversely corrugated parallel sidewalls 72c and 72d which lie in planes normal to the planes of the sidewalls 72a,b and which are interconnected to corresponding edges of the sidewalls 72a,b through curved or arced corner walls 74a–d. In the embodiment of FIG. 6, transverse corrugations 76a and 76b are formed in the sidewalls 72a and 72b, respectively, and lie in generally transverse planes which also contain the center axes of a corresponding pair of transverse corrugations 76c and 76d formed in the sidewalls 72c and 72d, respectively. The respective transverse corrugations 76a,b and 76c,d do not extend into the curved corner walls 74a–d and thus do not form continuous corrugations about the periphery of the sheath.

The electrical cable 80 includes a rectangular metallic sheath 82 having generally flat parallel sidewalls 82a and 82b which lie in planes parallel to the major transverse axis of the sheath. The sidewalls 82a,b are interconnected through generally semi-circular sidewalls 84a and 84b so as to form a smooth tubular metallic sheath having an oval transverse cross-sectional configuration which is defined broadly as generally rectangular. Both of the electrical cables 70 and 80 carry a pair of wrapped parallel insulated electrical conductors and are sized to enable relatively small radius bending about their major and minor transverse axes.

The various embodiments of the electrical cables in accordance with the invention exhibit a number of advantages over prior smooth wall and corrugated cable of generally circular transverse cross-section. For example, the flat generally rectangular electrical cables of the present invention carry parallel individual circuit and grounding conductors which results in saving approximately 3% conductor length over the use of conventional cabled electrical conductors as employed in prior metallic sheath cables of circular transverse cross section. The parallel circuit and grounding conductors within the metallic sheaths result in less conductor resistance per unit length of cable over twisted conductors and also save the installer time by not having to untwist the conductors when terminating.

The generally flat electrical cables of the invention also optimize space saving in installations, as well as providing aesthetic improvements, by enabling the exposed cable to be laid flat along walls, floor moldings, ceiling coves, and door frames and the like through the ability to bend the cable in small radius bends about both the major and minor transverse axes of the cables.

Existing electrical codes place restrictions on bend radius for conventional electrical cables of circular cross-section. For example, a bend radius of at least seven times the cable diameter must generally be maintained for a corrugated metal clad electrical cable of circular cross-section, and a minimum bend radius of ten times the cable outer diameter must be maintained for smooth wall metal clad cable of circular cross-section. The various embodiments of electrical cable in accordance with the present invention can be readily bent about either their major or minor axes in smaller radii than allowed under existing codes for similar AWG size cable but of circular cross section. The electrical cable of the present invention may be bent about its minor axis approximately one-half the bend radius required for prior electrical cables of the same AWG size having circular cross-section. This is particularly advantageous in installing and terminating electrical cable at junction boxes where space may be limited and where angle, offset and right-angle bends in the cable are necessary. A further advantage of the flat rectangular electrical cable of the present invention is that it enables a relatively large flat surface area of the cable to be claimped by a connector affixed to a terminal end of the cable, thereby substantially lowering the electrical grounding path resistance and preventing rotation of the electrical cable relative to the connector. Such improved electrical grounding significantly reduces the likelihood of poor grounding terminations which can lead to unsafe grounding hazards.

While preferred embodiments of the invention have been illustrated and described, it will be understood that changes and modifications may be made therein without departing from the invention in its broader aspects. Various features of the invention are defined in the following claims.

What is claimed is:

1. An electrical cable comprising an elongated tubular metallic sheath of generally rectangular transverse cross-sectional configuration having a greater major axis dimension than minor axis dimension, and at least one insulated electrical conductor extending longitudinally within said sheath, said sheath being defined by first and second pairs of substantially parallel, continuous and mutually perpendicular sidewalls connected along longitudinal marginal edges so as to form an uninterrupted closed internal passage to receive said electrical conductor, said sheath being of uniform wall thickness about its full periphery, and said sidewalls being corrugated along their longitudinal lengths to enable selective bending of the cable about said major and minor axes.

2. An electrical cable as defined in claim 1 wherein said first and second pairs of mutually perpendicular substantially parallel sidewalls have respective widths substantially equal to said major and minor axis dimensions of the sheath.

3. An electrical cable as defined in claim 2 wherein said sidewalls have integrally connected longitudinal marginal edges.

4. An electrical cable as defined in claim 1 wherein the corrugations formed along the longitudinal lengths of each of said sidewalls are disposed substantially transverse to the longitudinal axis of the corresponding sidewall.

5. An electrical cable as defined in claim 4 wherein the corrugations in adjacent mutually perpendicular sidewalls are staggered relative to each other.

6. An electrical cable as defined in claim 4 wherein the corrugations in adjacent mutually perpendicular sidewalls intersect each other at the longitudinal edges of said sidewalls.

7. An electrical cable as defined in claim 1 wherein the corrugations formed in said sidewalls are angularly inclined relative to a plane transverse to the longitudinal axis of the sheath.

8. An electrical cable as defined in claim 7 wherein each of said corrugations defines an inclined angle of inclination of approximately 15° with a plane transverse to the longitudinal axis of said sheath.

9. An electrical cable comprising an elongated tubular metallic sheath of generally rectangular transverse cross-sectional configuration having a greater major axis dimension than minor axis dimension, at least one insulated electrical conductor extending longitudinally within said sheath, said sheath being defined by first and second pairs of substantially parallel, continuous and mutually perpendicular sidewalls connected along longitudinal marginal edges so as to form an uninterrupted closed internal passage to receive said electrical conductor, said sheath being of uniform wall thickness about its full periphery, said sidewalls corresponding to the minor axis dimension of said sheath having parallel transverse corrugations formed along their longitudinal lengths, said sidewalls corresponding to said major axis dimension being substantially flat and devoid of corrugations.

10. An electrical cable as defined in claim 1 wherein said sheath carries at least two insulated electrical conductors having substantially coplanar longitudinal axes.

11. An electrical cable as defined in claim 10 including a grounding conductor extending longitudinally within said sheath parallel to said insulated electrical conductors.

12. An electrical cable as defined in claim 10 including means formed about said electrical conductors so as to maintain them in said parallel relation.

13. An electrical cable as defined in claim 2 wherein said sidewalls have transverse corrugations formed in equal spaced relation along their longitudinal lengths.

14. An electrical cable as defined in claim 1 wherein said corrugations are formed to establish approximately 4.5–5 corrugations per inch along the longitudinal length of said corrugated sidewalls.

15. An electrical cable as defined in claim 1 wherein each of said corrugations has a corrugation depth equal to between approximately 50% and 85% of the wall thickness of the metallic sheath.

16. An electrical cable as defined in claim 1 wherein said first and second pairs of parallel sidewalls are interconnected along their longitudinal marginal edges by curved corner walls.

17. An electrical cable comprising an elongated tubular seamless metallic sheath of substantially rectangular transverse cross-sectional configuration, said sheath being defined by first and second pairs of substantially parallel mutually perpendicular sidewalls having transverse widths generally approximating the transverse cross-sectional axis dimensions of the sheath, said first and second pairs of sidewalls being of uniform thickness and connected along longitudinal marginal edges so as to form an uninterrupted closed passage within said sheath, and at least two insulated electrical conductors extending longitudinally within said sheath passage such that their longitudinal axes are generally coplanar and parallel to the longitudinal axis of said sheath, said sidewalls being corrugated along their longitudinal lengths to enable bending generally about the transverse axes of said sheath.

18. An electrical cable as defined in claim 17 wherein said sidewalls have parallel corrugations formed along their longitudinal lengths.

19. An electrical cable as defined in claim 17 wherein said corrugations lie in planes transverse to the longitudinal axis of the sheath.

20. An electrical cable as defined in claim 17 wherein said corrugations are angularly inclined relative a plane transverse to the sheath.

21. An electrical cable as defined in claim 17 wherein said sheath has at least one helical corrugation formed in said sidewalls.

22. An electrical cable as defined in claim 1 wherein said sheath is made of a material enabling electrical grounding through the sheath.

23. An electrical cable as defined in claim 22 wherein said sheath is made of aluminum.

24. An electrical cable as defined in claim 1 wherein said sheath is made from a strip of metal having substantially parallel longitudinal marginal edges and formed into a generally rectangular tubular sheath with said longitudinal marginal edges in abutting relation and secured together to form a closed liquid impervious sheath having uniform wall thickness about its full periphery.

25. An electrical cable comprising an elongated tubular metallic sheath of generally rectangular transverse cross-sectional configuration, and at least one insulated electrical conductor extending longitudinally within said sheath, said sheath being defined by first and second pairs of substantially parallel, mutually perpendicular sidewalls formed from a metallic helically wound strip so as to form a closed internal passage to receive said electrical conductor, said sidewalls being corrugated along their longitudinal lengths to enable bending of the cable about the transverse axes of the sheath.

26. An electrical cable as defined in claim 25 wherein said helically wound strip has longitudinal marginal edges formed to effect overlapping of juxtaposed edges of the helically wound strip.

27. An electrical cable as defined in claim 26 wherein said longitudinal marginal edges are formed into generally sine wave transverse profile configuration so as to effect nested overlapping relation of juxtaposed edges of the helically wound strip.

* * * * *

UNITED STATES PATENT AND TRADEMARK OFFICE
CERTIFICATE OF CORRECTION

PATENT NO. : 5,001,303
DATED : March 19, 1991
INVENTOR(S) : Allan Coleman & Wayne J. Kowalski It is certified that error appears in the above-identified patent and that said Letters Patent is hereby corrected as shown below:

Column 3, line 32, insert a period (.) after "respectively";
Column 3, line 36, insert a period (.) after "sheath";
Column 4, line 65, insert a period (.) after "sheaths";
Column 4, line 67, insert a period (.) after "desired";
Column 5, line 48, insert a period (.) after "surfaces";
Column 7, line 3, "claimped" should be --clamped--.

Signed and Sealed this

Twenty-second Day of September, 1992

*Attest:*

DOUGLAS B. COMER

*Attesting Officer*   Acting Commissioner of Patents and Trademarks